Feb. 26, 1935.　　　D. P. THOMSON　　　1,992,260
SAFETY DEVICE FOR SPECTACLES
Filed Nov. 23, 1931
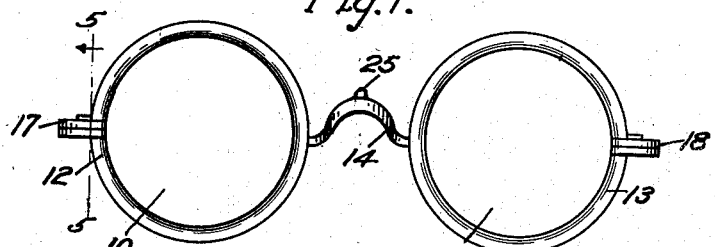
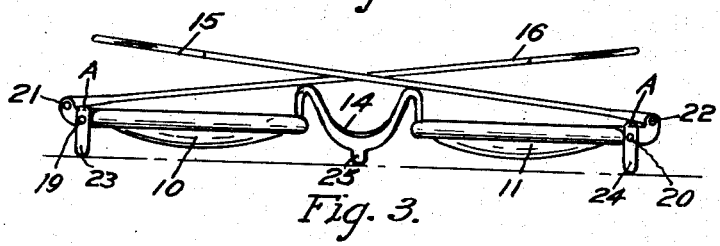
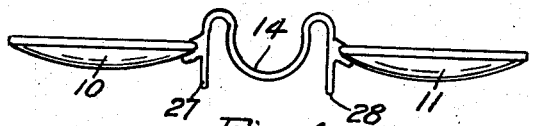
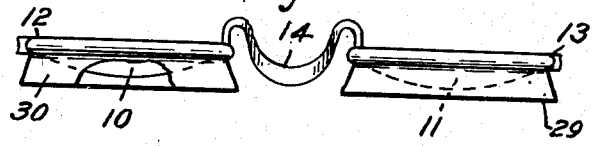
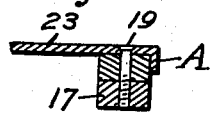
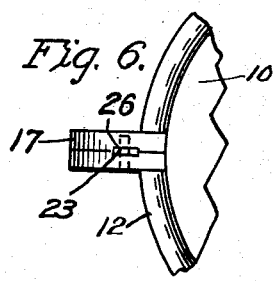
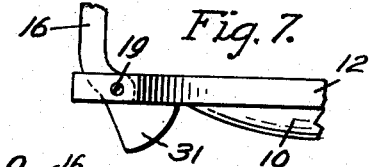
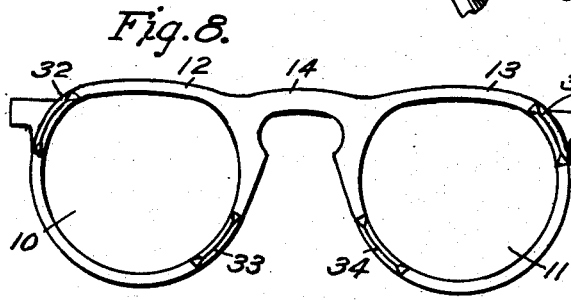
Inventor,
David P. Thomson,
Frank G. Hattie
Attorney.

Patented Feb. 26, 1935

1,992,260

UNITED STATES PATENT OFFICE 1,992,260

SAFETY DEVICE FOR SPECTACLES

David P. Thomson, Lynn, Mass.

Application November 23, 1931, Serial No. 576,835

2 Claims. (Cl. 88—41)

The invention relates to improvements in safety devices for spectacle lenses consisting of projecting arms extending away from the frame of the spectacles sufficiently to project beyond the protruding or concave lenses to take the impact should the spectacles fall on a hard surface which otherwise would break them. It is well known that great losses take place due to lenses being broken from a fall and to obviate this condition safety devices have been provided which will take the impact should the spectacles fall.

The object of the invention is to provide safety devices for spectacle lenses which will reduce the breakage to a minimum should the spectacles fall. A further object of the invention is to provide means for readily placing the devices in position with a minimum cost of manufacture.

Referring to the figures.

Figure 1 is a front elevation of the spectacles with the safety devices in position.

Figure 2 is a plan view of the same.

Figure 3 is a plan view of the spectacles with the safety devices formed integral with the nose member.

Figure 4 is a plan view of the spectacles with the safety devices in the form of an annular shroud secured to the spectacle frames.

Figure 5 is an enlarged cross-section of the safety devices taken on the line 5—5 Figure 1.

Figure 6 is an enlarged elevation of the safety device secured to a slot in the frame.

Figure 7 is a full sized view of a safety device secured to the bow of the spectacles.

Figure 8 is a modified construction of the safety devices mounted on a special frame.

Figure 9 is a partial plan view of the same.

Referring to the drawing, which illustrates the improved safety devices for protruding or concave lenses for spectacles, the numerals 10 and 11 indicate the lenses mounted in the frames 12 and 13. The frames are connected by a nose member 14 in the usual manner. Generally spectacles are provided with bows 15 and 16 which extend over the ears of the wearer to hold them in position. The frames 12 and 13 are split on their outer sides and are provided in this part of the structure with projections 17 and 18 which allows the frame to be opened up to place the lenses 10 and 11 in position or take them out as the conditions require. After the lenses are placed in position they are held by clamp screws 19 and 20. The ends of the projections 17 and 18 are cut away in the line of the split sufficiently to pivotally secure the bows 15 and 16 in position and are held by the screws 21 and 22.

The embodiment of the invention lies in providing safety devices 23 and 24 on the frames 12 and 13 which extend beyond the protruding or concave lenses sufficiently to take the impact should the spectacles fall on a hard surface. After the safety devices are placed in position one end is bent over as indicated by "A" to lock the members in position. To decrease the chances of breaking the lenses a third safety member 25 is provided which is formed integral with the nose member 14. The three protecting members 23—24 and 25 are best shown in Figures 1 and 2. If the spectacles fall on a flat surface all three members will take the impact. If the spectacles fall on an uneven surface they may fall on two of the safety members which would decrease the chances of breaking the lenses. The safety members 23 and 24 are held in position by the screws 19 and 20 and locked by the projections "A". By this construction the safety members are rigidly secured to the spectacle frames.

The structures can be made in several modifications. In Figure 6 the safety arm 23 is set in the slot 26 cut in the split part of the frame 11 and held in position by the screw 19.

In Figure 3 the lenses are not set in the frames but are held together by the nose member 14. The safety devices in this structure are integral with the nose member and consists of two projections or arms 27 and 28 extending beyond the protruding or concave lenses sufficiently to decrease the chances of breakage should the spectacles fall on a hard surface.

In Figure 4 the spectacle frames are provided with annular shrouds 29 and 30 concentric with the lenses and extend beyond them sufficiently to absolutely protect them should they fall.

In Figure 7 a modified construction is shown of the safety device forming a part of the bow 16 which pivots in a slot cut in the frame 12 at 21. The bow 16 extends through the slot in the frame in the form of a segment 31 which at all times swings in a circle of sufficient distance beyond the portruding or concave lenses to protect them if they fall on a hard object or surface.

In Figures 8 and 9 are shown the adaptation of the safety devices to spectacles having special frames with bows secured to the top of the said frame with the safety devices 32—33—34 and 35 located diagonally across the frame to provide the greatest protection to this type of structure.

In operation the protecting devices can be adapted to any type of spectacle having protruding or concave lenses so they can be protected should they fall on a hard surface.

What I claim as new and desire to secure by Letters Patents of the United States is:

1. In a safety device for spectacles having a frame, concave lenses mounted in the frame, lugs integral with the frame, one on each end of the frame, bows supported by lugs, an arm secured to the lug on each end of the said frame, and extending forwardly beyond the lenses, screws for holding the bows and arms in position and means for locking the arms.

2. In a safety device for spectacles having a frame, concave lenses mounted in the frame, lugs integral with the frame, one on each end of the said frame, bows supported by lugs, an arm secured to the lug on each end of the frame and extending forwardly beyond the lenses, screws for holding the bows and arms in position, a clip bent over each lug for locking the arms.

DAVID P. THOMSON.